J. T. MACK.
SHORT TURNING GEAR.
APPLICATION FILED OCT. 27, 1908.

1,108,507.

Patented Aug. 25, 1914.
2 SHEETS—SHEET 1.

Witnesses:
E. A. Volk.
A. G. Dimond.

Inventor.
James T. Mack,
by Wilhelm, Parker & Hand,
Attorneys.

J. T. MACK.
SHORT TURNING GEAR.
APPLICATION FILED OCT. 27, 1908.
1,108,507.
Patented Aug. 25, 1914.
2 SHEETS—SHEET 2.
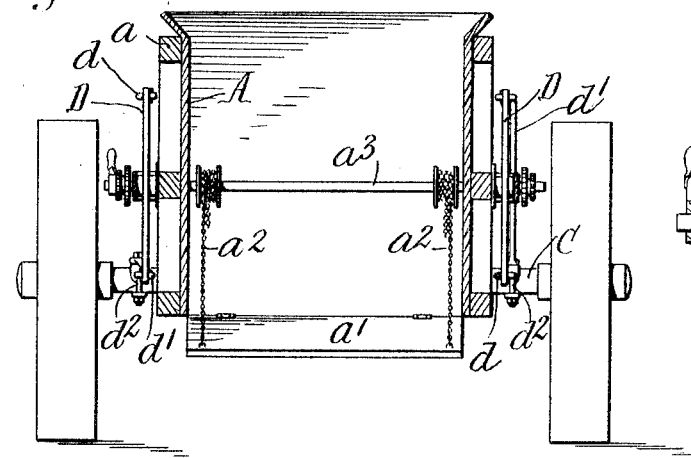
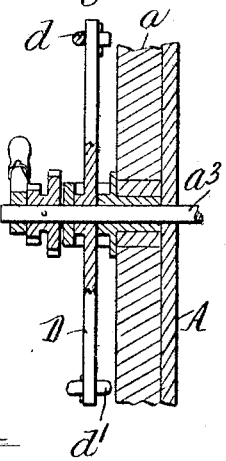
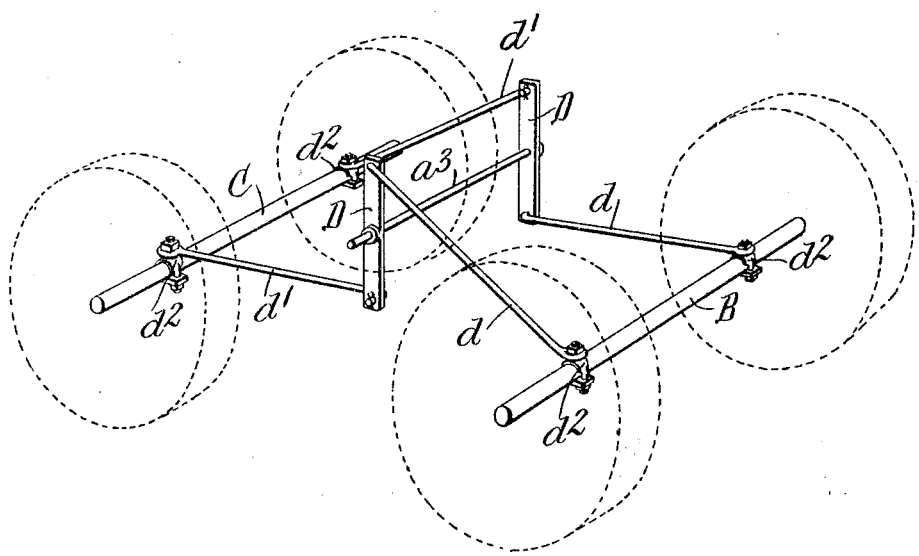
Witnesses:
E. A. Volk.
A. G. Dimond.
Inventor:
James T. Mack,
by Wilhelm, Parker & Ward,
Attorneys.

UNITED STATES PATENT OFFICE.

JAMES T. MACK, OF BUFFALO, NEW YORK.

SHORT-TURNING GEAR.

1,108,507.          Specification of Letters Patent.      Patented Aug. 25, 1914.

Application filed October 27, 1908. Serial No. 459,729.

*To all whom it may concern:*

Be it known that I, JAMES T. MACK, a citizen of the United States, residing at Buffalo, in the county of Erie and State of New York, have invented a new and useful Improvement in Short-Turning Gears, of which the following is a specification.

This invention relates to improvements in short turning gears for vehicles, in which the front and rear trucks of the vehicle are swiveled to the body to swing horizontally and are connected together in such a manner that the turning of one truck in either direction produces an opposite movement of the other truck.

The object of the invention is to provide a short turning gear of this character, of simple and inexpensive construction in which the connections between the front and rear trucks are arranged along the sides of the vehicle instead of in the usual location beneath the body, thus more especially adapting the turning gear for use in bottom dumping wagons, and other vehicles in which it is desired for any reason to leave the space beneath the body unobstructed.

Figure 1:
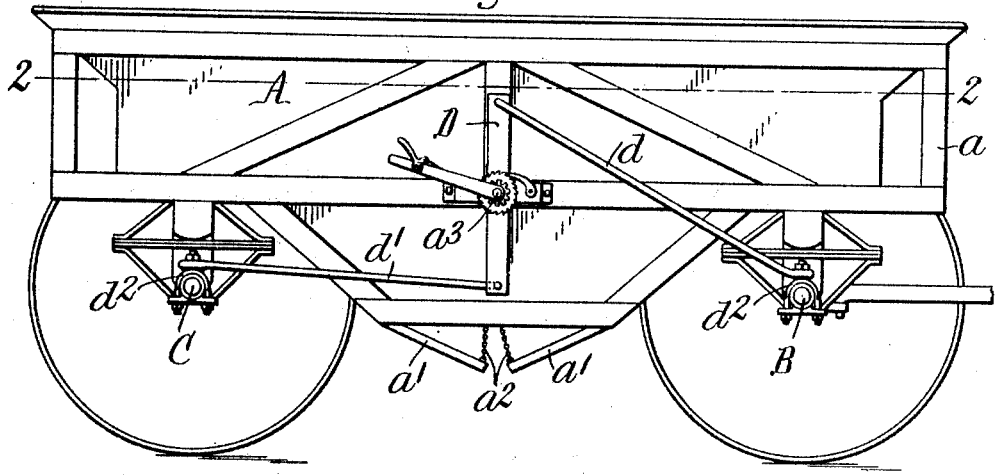
Figure 2:
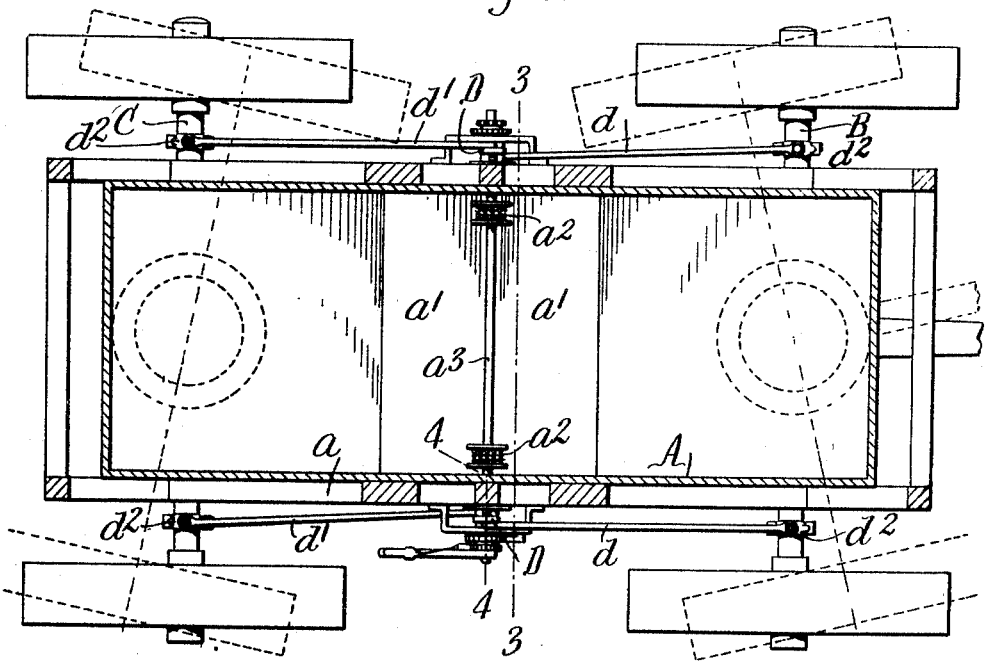

In the accompanying drawings, consisting of two sheets: Figure 1 is a side elevation of a dumping wagon provided with a short turning gear embodying the invention, the wheels on the near side of the wagon being removed. Fig. 2 is a sectional plan thereof on line 2—2, Fig. 1. Fig. 3 is a transverse sectional elevation on line 3—3, Fig. 2. Fig. 4 is a fragmentary sectional elevation of the short turning gear and wagon body, on an enlarged scale, on line 4—4, Fig. 2. Fig. 5 is a fragmentary perspective view of the gear, the wheels being shown in dotted lines.

Like letters of reference refer to like parts in the several figures.

A represents the body of a dumping wagon or car which is of common construction, having the usual frame $a$ in which the wagon box is secured, the bottom of the box being provided with hinged dumping doors $a'$ which are connected by chains $a^2$ with a transverse winding shaft $a^3$ journaled in the frame $a$ with its ends projecting beyond the sides thereof where they are provided with the usual devices for rotating the shaft for raising and lowering the dumping doors.

B and C represent the axles of the front and rear trucks of the wagon which are centrally swiveled to the frame $a$ in the usual manner to turn horizontally in either direction and to one of which a tongue or other draft device is connected by means of which the vehicle is propelled and steered.

D D represent levers which are pivoted between their ends on the body of the wagon at opposite sides thereof, the opposite ends of each lever being connected by rods $d\ d'$ to the front and rear trucks. In the construction shown, the levers D D are journaled to swing vertically on the end portions of the winding shaft $a^3$ outside of the wagon body, and the connecting rods are pivoted to studs on clevises $d^2$ secured on the ends of the front and rear axles. The levers D D normally stand substantially vertically and the rods $d\ d'$ extend from the levers at an angle thereto and substantially parallel with the sides of the body. As the rods $d\ d'$ are connected to the arms of the lever D on opposite sides of its fulcrum, any longitudinal movement of either rod will cause a corresponding movement of the other rod in an opposite direction. It will thus be seen that the turning of one truck in one direction will cause the other truck to turn an equal distance in an opposite direction, thus facilitating the short turning of the wagon, and it is of no importance to which end of the vehicle the draft attachment is secured, as the turning of either truck produces a corresponding opposite movement of the other truck.

The projecting ends of the winding shaft $a^3$ provide convenient pivots for the levers D upon which these levers can swing in a substantially vertical plane, but the levers can be pivotally supported between their ends at the sides of the body in any other suitable way and in any other desired position, so that when the levers are swung on their pivots by the turning of one truck in one direction, they will cause the other truck to turn in an opposite direction.

Upon heavy wagons, such as the one shown in the drawings, the levers and connecting rods are preferably arranged on each side of the wagon body, as shown, for connecting the front and rear trucks at both ends, but in lighter vehicles, one lever and its connecting rods may be dispensed with and the trucks connected together by a lever and rods arranged on one side only of the vehicle. The connecting rods extending substantially parallel with the sides of the body and the levers being pivoted thereto to swing in substantially vertical planes, it will be seen that these parts do not obstruct the space below the bottom of the body. This is of especial advantage in dumping wagons but the gear may, of course, be used upon other vehicles if desired.

I claim as my invention:

1. In a dumping wagon, the combination with a body provided with a bottom dumping door, of front and rear swiveled supporting trucks for the body, a draft device connected to said front truck for propelling and steering the wagon, levers pivoted between their ends on said body at opposite sides of said dumping door to swing independently of each other in upright planes, a rod connecting each end of said front truck to one end of each of said levers for swinging said levers when the front truck is turned, and a rod connecting the other end of each of said levers to one end of said rear truck for causing said rear truck to turn in a direction opposite to the direction of movement of the front truck, substantially as set forth.

2. The combination with a dumping wagon provided with front and rear swiveled trucks and a body mounted thereon having dumping means in its bottom, and an operating shaft for said dumping means, of levers pivoted between their ends to said operating shaft at opposite sides of said body, and rods connecting the opposite ends of each lever to said front and rear trucks, substantially as set forth.

Witness my hand, this 24th day of October, 1908.

JAMES T. MACK.

Witnesses:
E. C. HARD,
C. B. HORNBECK.

---

Copies of this patent may be obtained for five cents each, by addressing the "Commissioner of Patents, Washington, D. C."